(12) United States Patent
Ichikawa

(10) Patent No.: US 9,038,795 B2
(45) Date of Patent: May 26, 2015

(54) CORD STORAGE APPARATUS

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 13/879,483

(22) PCT Filed: Jan. 12, 2011

(86) PCT No.: PCT/JP2011/050308
§ 371 (c)(1),
(2), (4) Date: Apr. 15, 2013

(87) PCT Pub. No.: WO2012/095951
PCT Pub. Date: Jul. 19, 2012

(65) Prior Publication Data
US 2013/0277484 A1    Oct. 24, 2013

(51) Int. Cl.
*H02G 11/02* (2006.01)
*B65H 75/42* (2006.01)
*B65H 75/44* (2006.01)
*B60L 11/18* (2006.01)
(Continued)

(52) U.S. Cl.
CPC ............ *H02G 11/02* (2013.01); *B65H 75/425* (2013.01); *B65H 75/4484* (2013.01); *B65H 2701/34* (2013.01); *B60L 11/1816* (2013.01); *B60L 2230/12* (2013.01); *Y02T 10/7088* (2013.01); *Y02T 90/121* (2013.01); *Y02T 90/14* (2013.01); *B60L 11/005* (2013.01); *B60L 11/123* (2013.01); *B60L 11/14* (2013.01); *B60L 11/1803* (2013.01); *B60L 11/1883* (2013.01); *B60L 2220/14* (2013.01); *B60L 2240/80* (2013.01); *B60L 2260/44* (2013.01); *Y02T 10/7077* (2013.01); *Y02T 10/7022* (2013.01); *Y02T 90/34* (2013.01); *Y02T 10/6217* (2013.01)

(58) Field of Classification Search
CPC ... H02G 11/02; H02G 11/00; B65H 75/4484; B65H 75/4486; B65H 75/425; B65H 2701/34; B65H 75/42; B60L 2230/12; A47L 9/26
USPC ....... 191/12.2 A; 320/109; 901/1; 242/390.9; 318/6
See application file for complete search history.

(56) References Cited

U.S. PATENT DOCUMENTS 4,692,569 A * 9/1987 Winner .................. 191/12 R
5,551,545 A * 9/1996 Gelfman ................ 191/12.2 A

FOREIGN PATENT DOCUMENTS

JP    U-59-41026    3/1984
JP    A-62-272804   11/1987
(Continued)

OTHER PUBLICATIONS

Partial translation of Written Opinion of International Searching Authority issued in International Patent Application No. PCT/JP2011/050308 dated Mar. 22, 2011.

*Primary Examiner* — Mark Le
(74) *Attorney, Agent, or Firm* — Oliff PLC

(57) ABSTRACT

A cord storage apparatus includes an electric motor configured to retract a power reception cord to be connected to an external power supply and a control unit configured to determine whether or not the power reception cord is retracted away from the ground when the power reception cord is connected to the external power supply and control the electric motor to stop retracting the power reception cord when the power reception cord is retracted away from the ground.

8 Claims, 6 Drawing Sheets

(51) Int. Cl.
  *B60L 11/00* (2006.01)
  *B60L 11/12* (2006.01)
  *B60L 11/14* (2006.01)

(56) References Cited

FOREIGN PATENT DOCUMENTS

| JP | A-1-174214 | 7/1989 |
| JP | A-2-41616 | 2/1990 |
| JP | A-6-509779 | 11/1994 |
| JP | A-7-79502 | 3/1995 |
| JP | A-7-171079 | 7/1995 |
| JP | A-11-199189 | 7/1999 |
| JP | A-2000-264547 | 9/2000 |
| JP | A-2003-73099 | 3/2003 |
| JP | U-3093370 | 5/2003 |
| JP | A-2003-219511 | 7/2003 |
| JP | A-2003-244832 | 8/2003 |
| JP | A-2005-348867 | 12/2005 |
| JP | A-2009-112076 | 5/2009 |
| WO | WO 93/02957 A1 | 2/1993 |
| WO | WO 97/10967 A1 | 3/1997 |

\* cited by examiner

CORD STORAGE APPARATUS

TECHNICAL FIELD

The present invention relates to a cord storage apparatus, and in particular, to a technique for retracting a cord away from the ground.

BACKGROUND ART

A vehicle which has a power storage device (for example, a secondary battery, a capacitor or the like) and travels on a driving force generated from electric power stored in the power storage device has drawn attention as an environment-friendly vehicle. Such vehicle includes for example, an electric vehicle, a hybrid vehicle, a fuel cell vehicle and the like. Moreover, there has been proposed a technique for charging the power storage device mounted in those vehicles with a commercial power supply having a high power generation efficiency.

Among hybrid vehicles, some hybrid vehicles have been known as being similar to an electric vehicle, namely as having a vehicular power storage device which can be charged by a power supply external to the vehicle (hereinafter, simply referred to as "external power supply") (this manner of charging is hereinafter referred to as "external charging"). For example, there has been known a so-called "plug-in hybrid vehicle" which is possible to have the power storage device charged from a general household power supply by connecting a power outlet disposed inside the household and a charging port disposed in the vehicle through a power reception cord. Thereby, it can be expected to improve a fuel efficiency of the hybrid vehicle.

After the charging is completed, the power reception cord is housed in a cord reel or the like. Japanese Patent Laying-Open No. 2003-244832 (PTL 1) discloses an electric vehicle provided with a retractable cord for charging a battery.

CITATION LIST

Patent Literature

PTL 1: Japanese Patent Laying-Open No. 2003-244832

SUMMARY OF INVENTION

Technical Problem

If the cord contacts the ground during the time when the power storage is being charged, it is possible to have mud adhered to the cord. Therefore, a user may have to clean the cord after the end of the charging. Thereby, the contact of the cord with the ground may be inconvenient for the user.

An object of the present invention is to reduce a dirt adhesion level of a cord.

Solution to Problem

A cord storage apparatus includes a retracting device configured to retract a cord to be connected to a power supply, and a control unit configured to determine whether or not the cord is retracted away from the ground when the cord is connected to the power supply and control the retracting device to stop retracting the cord when the cord is retracted away from the ground.

Advantageous Effects of Invention

When the cord is connected to the power supply, the cord is retracted away from the ground. Accordingly, it is possible to reduce an amount of mud or the like adhered to the cord. Thereby, it is possible to reduce a dirt adhesion level of the cord.

DESCRIPTION OF EMBODIMENTS

Figure 1:
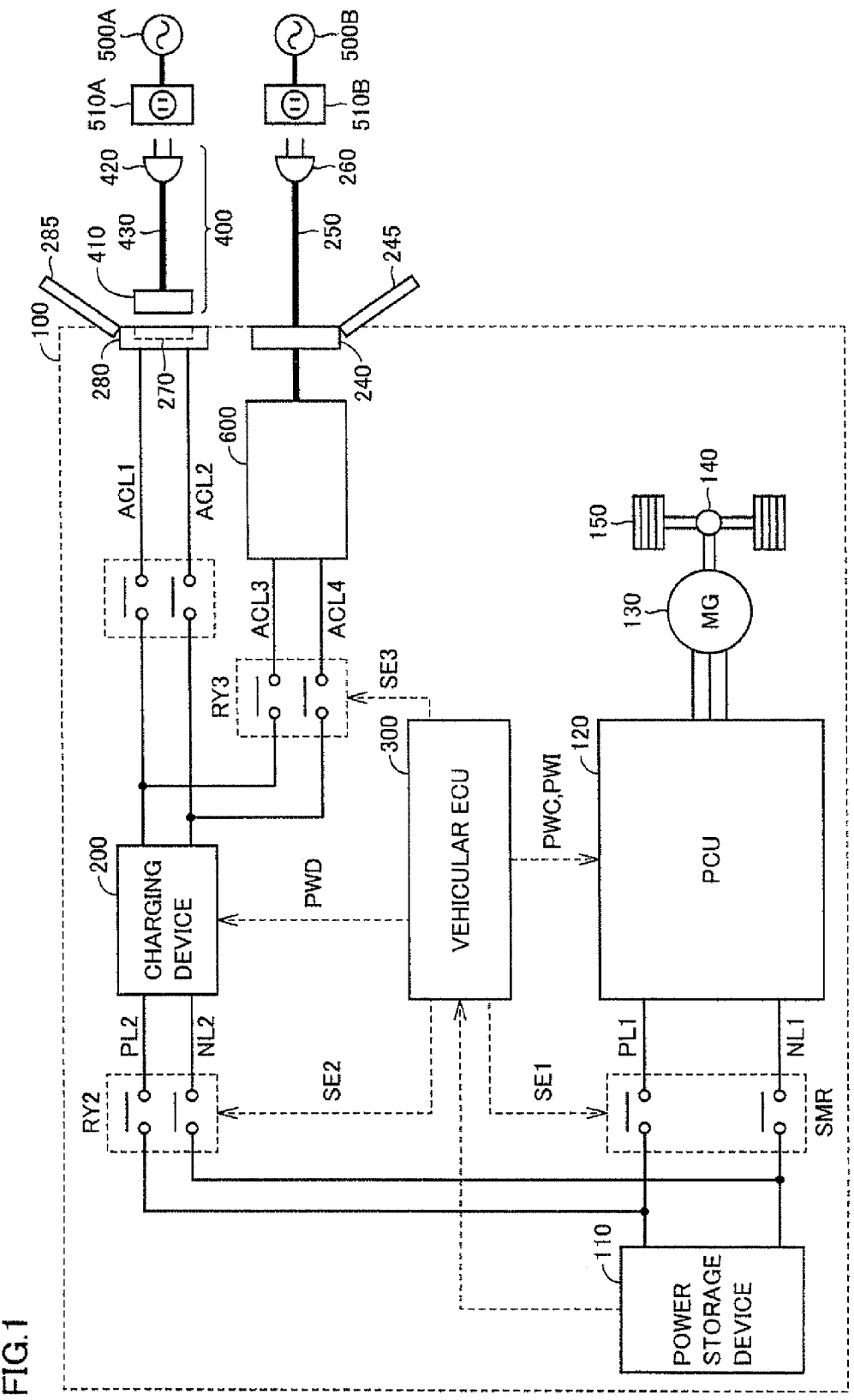
FIG. 1 is an overall block diagram of a vehicle mounted with a cord storage apparatus.

Hereinafter, an embodiment of the present invention will be described in detail with reference to the drawings. The identical or equivalent parts in the drawings will be assigned with the same reference numerals, and the description thereof will be not be repeated.

FIG. 1 is an overall block diagram of a vehicle 100 mounted with a cord storage apparatus 600.

With reference to FIG. 1, vehicle 100 includes a power storage device 110, a SMR (System Main Relay), a PCU (Power Control Unit) 120, a motor generator 130, a power transmission gear 140, a driving wheel 150, and a vehicular ECU (Electronic Control Unit) 300.

Power storage device 110 is an electric power storing element configured as being chargeable and dischargeable. Power storage device 110 is configured to include a power storage element, for example, a secondary battery such as a lithium-ion battery, a nickel-metal hydride battery and a lead battery, or an electric double layer capacitor or the like.

14 Power storage device 110 is connected to PCU 120 through a power line PL1 and a ground line NL1. Power storage device 110 supplies electric power to PCU 120 so as to generate a driving force for vehicle 100. Further, power storage device 110 stores electric power generated from motor generator 130. An output from power storage device 110 is about 200 V, for example.

A relay disposed inside SMR is inserted respectively in power line PL1 which connects power storage device 110 to PCU 120 and ground line NL1 which connects power storage device 110 to PCU 120. Accordingly, SMR switches on or switches off the supply of power between power storage 110 and PCU 120 on the basis of a control signal SE1 from vehicular ECU 300.

Though not illustrated in any of the drawings, PCU 120 is configured to include a converter for boosting a power voltage supplied from power storage device 110, an inverter for converting DC power boosted by the converter into AC power for driving motor generator 130, and the like.

The converter and inverter mentioned above are respectively controlled by control signals PWC and PWI from vehicular ECU 300.

Motor generator 130 is an AC rotating electrical machine, for example, a permanent magnet synchronous motor equipped with a rotor having a permanent magnet buried therein.

An output torque from motor generator 130 is transmitted to driving wheel 150 so as to drive vehicle 100 through the intermediary of power transmission gear 140 configured to include a reducer and a power split device. In a regenerative braking operation of vehicle 100, motor generator 130 may generate power from a rotating force of driving wheel 150, and the generated power is converted by PCU 120 to a charging power for charging power storage device 110.

In the configuration illustrated in FIG. 1, only one motor generator is disposed; however, the number of motor generators is not limited to one, it is acceptable to dispose a plurality of motor generators.

In the case where a hybrid vehicle is mounted with an engine (not shown) in addition to motor generator 130, required driving force is generated according to cooperative operations of the engine and motor generator 130. In this case, it is possible to charge power storage device 110 by using the generated power from the rotations of the engine.

In other words, vehicle 100 in the present embodiment is illustrated as a vehicle mounted with an electric motor configured to generate a driving force for the vehicle, and it may include a hybrid vehicle which generates the driving force for the vehicle from an engine and an electric motor, an electric vehicle and a fuel cell vehicle without an engine, and the like.

Though not illustrated in FIG. 1, vehicular ECU 300 includes a CPU (Central Processing Unit), a memory device and an input/output buffer, and is configured to receive input signals from each sensor or the like, output control signals to each device, and control vehicle 100 and each device. Such control of the vehicle and each device is not limited to be performed by software but also possible to be performed in dedicated hardware (electronic circuit).

Vehicular ECU 300 is configured to generate and output control signals for controlling PCU 120, SMR and the like. In the configuration illustrated in FIG. 1, only one vehicular ECU 300 is disposed; however, it is acceptable to dispose an individual control unit for each function or for each device to be controlled, for example, a control unit for PCU 120, a control unit for power storage device 110 and the like.

Vehicle 100 includes an inlet 270, a charging device 200 and a relay RY2 as components for charging power storage device 110 by using electric power from an external power supply 500A.

Inlet 270 is disposed inside a power reception port 280 disposed at an outer surface of vehicle 100. Power reception port 280 is incorporated with a movable lid 285 configured to cover inlet 270 when the external charging is not performed.

A charging connector 410 of a charging cable 400 is connected to inlet 270. Thereby, the electric power from external power supply 500A is transmitted to vehicle 100 through charging cable 400.

In addition to charging connector 410, charging cable 400 includes a plug 420 to be connected to an outlet 510A to external power supply 500A, and a line section 430 for connecting charging connector 410 and plug 420. It is acceptable to include in line section 430 a charging-circuit blocking device (not shown) for switching on or off the supply of the electric power from external power supply 500A.

Inlet 270 is connected to charging device 200 through power lines ACL1 and ACL2. A relay is also disposed at a position between inlet 270 and charging device 200.

Vehicle 100 further includes a power reception cord 250 and a cord storage apparatus 600 as an alternative path for charging power storage device 110 by using the electric power from an external power supply 50013.

One end of power reception cord 250 is connected with a plug 260 to be connected to an outlet 510B to external power supply 500B. The other end of power reception cord 250 is connected to power lines ACL3 and ACL4 which are connected to charging device 200.

Power lines ACL3 and ACL4 are connected to power lines ACL1 and ACL2, respectively, through the intermediary of a relay RY3. Relay RY3 is controlled by a control signal SE3 from vehicular ECU 300. Relay RY3 is configured to be electrically connected when the external charging is being performed through power reception cord 250 and disconnected when the external charging is not performed through power reception cord 250.

When the external charging is not performed, power reception cord 250 is wound by cord storage apparatus 600 and held therein. When the external charging is performed through power reception cord 250, power reception cord 250 is pulled out from a pullout opening (not shown) of a power reception port 240 disposed at the outer surface of vehicle 100. By connecting plug 260 to outlet 510B, the electric power is transmitted from external power supply 500B to vehicle 100.

In FIG. 1, the configuration is illustrated as having charging cable 400 to be connected to outlet 510A of external power supply 500A or having power reception cord 250 to be connected to outlet 510B of external power supply 500B. The voltage of external power supply 500A and the voltage of external power supply 510A may be the same or may be different. In the case of different voltages, for example, charging cable 400 may be used when the voltage of the external power supply is 200 V, and power reception cord 250 may be used when the voltage of the external power supply is 100 V.

Power reception port 240 is incorporated with a movable lid 245 configured to cover the pullout opening when the external charging is not performed.

Charging device 200 is connected to inlet 270 through power lines ACL1 and ACL2. Charging device 200 is connected to power storage device 110 through the intermediary of relay RY2 by power line PL2 and ground line NL2.

Charging device 200 converts AC power supplied through inlet 270 or power reception cord 250 into electric power for charging power storage device 110.

Figure 2:
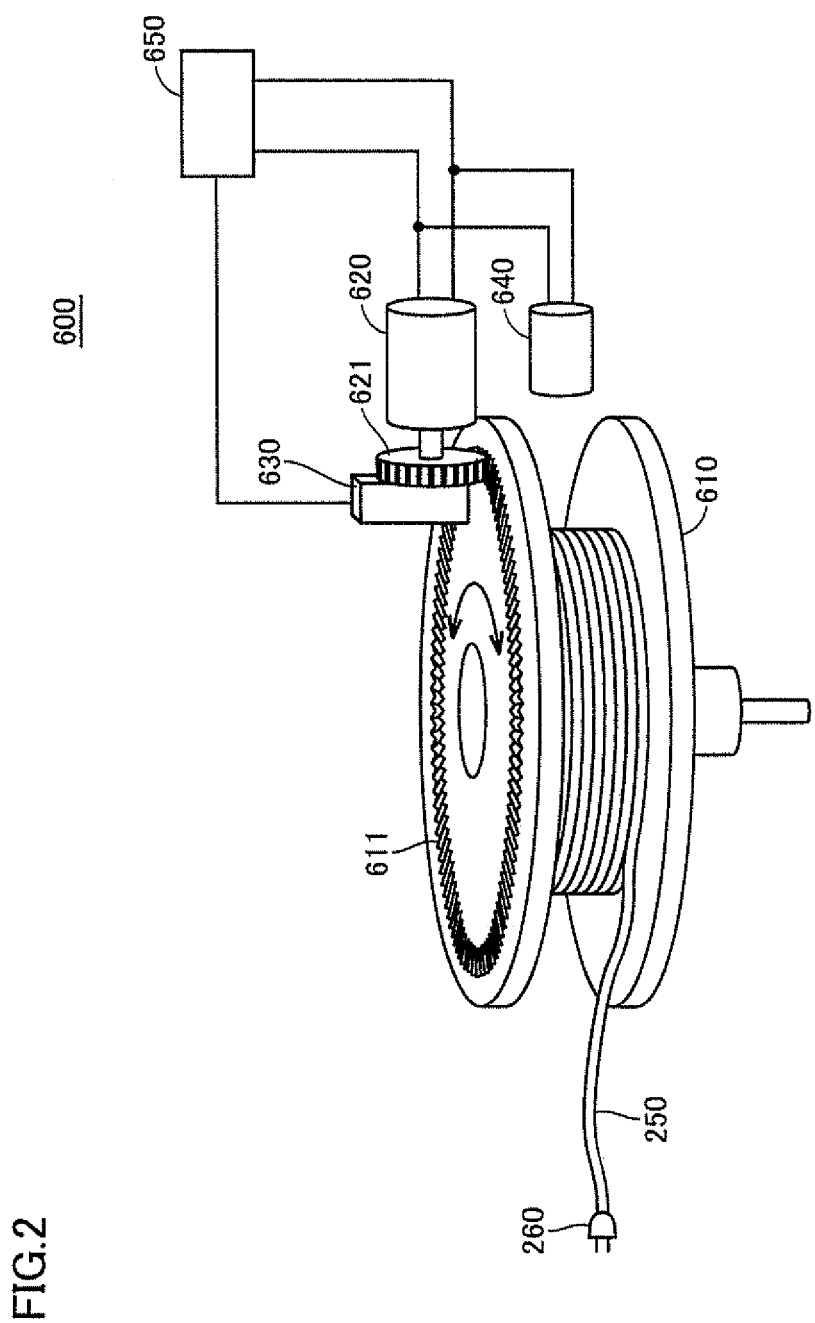
FIG. 2 is a schematic diagram of the cord storage apparatus.

With reference to FIG. 2, cord storage apparatus 600 includes a cord reel 610, an electric motor 620, and a control unit 650.

Cord reel 610 is disposed with a cylindrical body configured to wind thereon power reception cord 250. When power reception cord 250 is used to perform the external charging, power reception cord 250 wound on cord reel 610 is pulled out. While the external charging is not performed, cord reel 610 wraps power reception cord 250 and holds it therein.

A rotating shaft of electric motor 620 is disposed with a gear 621. Gear 621 is arranged in such a way that it is engageable with a gear 611 disposed on a side surface of cord reel 610.

In wrapping power reception cord 250 on cord reel 610, gear 621 is rotated by electric motor 620. For example, when a user presses a switch or the like, cord reel 610 is rotated by electric motor 620 in the direction of winding power reception cord 250. Accordingly, power reception cord 250 is held in cord storage apparatus 600.

Moreover, when a user connects plug 260 of power reception cord 250 to external power supply 500B to charge power storage device 110, control unit 650 controls elector motor 620 to rotate cord reel 610 in the direction of winding power reception cord 250. Power reception cord 250 is wound and thereby power reception cord 250 is retracted away from the ground. In other words, electric motor 620 functions as a device for retracting power reception cord 250. Power reception cord 250 is retracted continuously until power reception cord 250 is away from the ground.

Specifically, control unit 650 determines whether or not power reception cord 250 is retracted away from the ground when power reception cord 250 is connected to external power supply 500B, and controls electric motor 620 to stop retracting power reception cord 250 when power reception cord 250 is retracted away from the ground.

In the present embodiment, electric motor 620 is controlled to retract power reception cord 250 at a constant torque, i.e., a constant force. It is acceptable that electric motor 620 is controlled to retract power reception cord 250 at a constant power.

Figure 3:
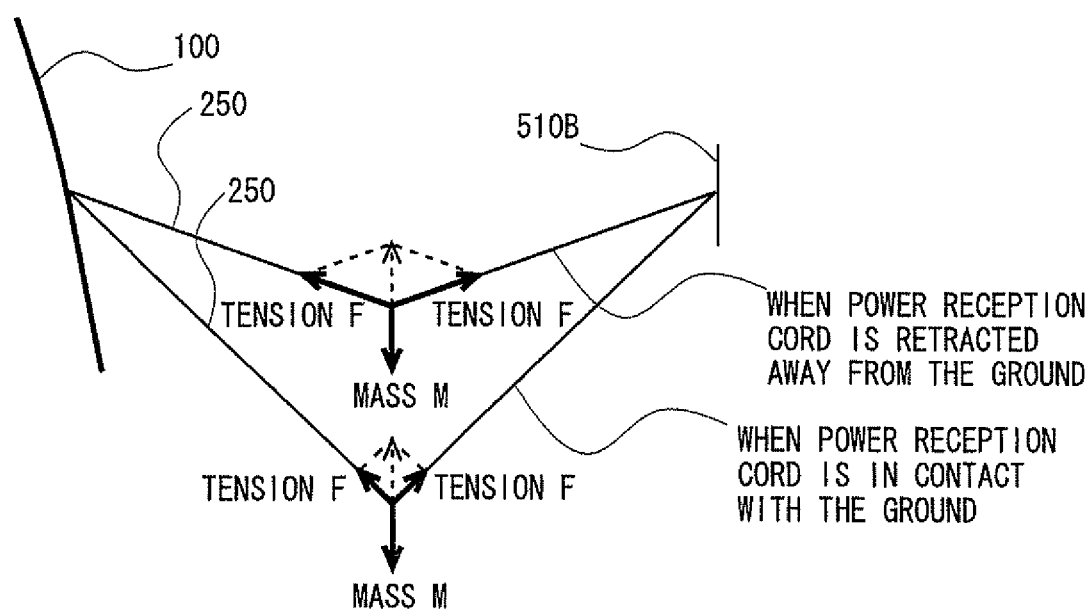
FIG. 3 is a diagram illustrating a tension applied to a power reception cord.

Whether or not power reception cord 250 is retracted away from the ground is determined, for example, on the basis of a rotation speed of cord reel 610 detected by a speed sensor 630. As illustrated in FIG. 3, a tension on power reception cord 250 when power reception cord 250 is retracted away from the ground, in other words, a force required to retract power reception cord 250 is greater than a tension on power reception cord 250 when power reception cord 250 is in contact with the ground. Therefore, a speed retracting power reception cord 250 when power reception cord 250 is retracted away from the ground is smaller than a speed retracting power reception cord 250 when power reception cord 250 is in contact with the ground. That is to say, the rotation speed of cord reel 610 when power reception cord 250 is retracted away from the ground is smaller than the rotation speed of cord reel 610 when power reception cord 250 is in contact with the ground. Taken into consideration the above matters, as illustrated in FIG. 4, when the rotation speed of cord reel 610 becomes smaller than a predetermined first threshold, it is determined that power reception cord 250 is retracted away from the ground.

Figure 5:
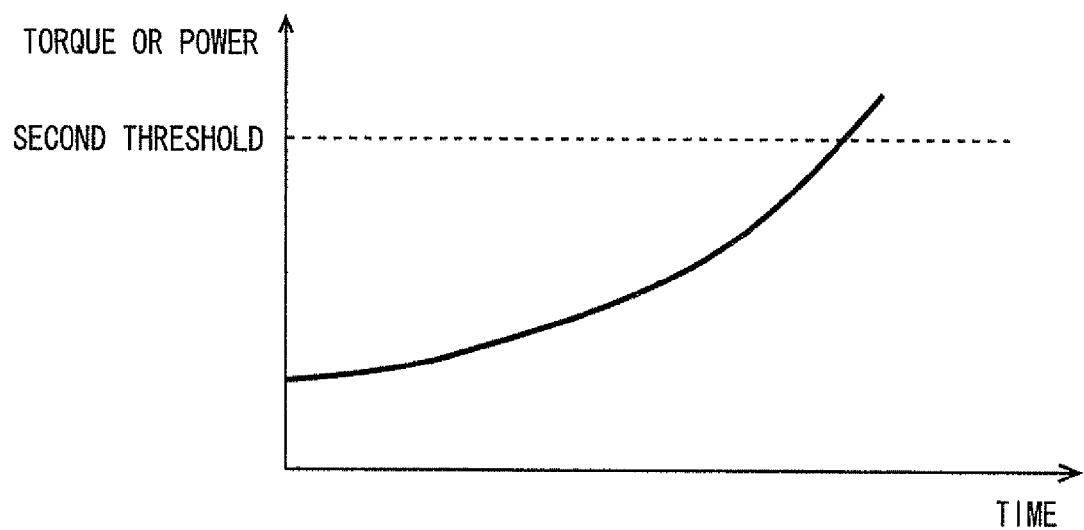
FIG. 5 is a diagram illustrating an output torque or an output power from an electric motor.

It is also acceptable that electric motor 620 is controlled to retract power reception cord 250 at a constant speed. In this case, it is acceptable that control unit 650 controls electric motor 620 to stop retracting power reception cord 250 when a force for retracting power reception cord 250 increases to be greater than a predetermined threshold. More specifically, as illustrated in FIG. 5, when an output torque or an output power from electric motor 620 increases to be greater than a predetermined second threshold, it is possible to determine that power reception cord 250 is retracted away from the ground.

The output torque or the output power of electric motor 620 is estimated or calculated on the basis of a voltage and a current or the like of electric motor 620. The estimation or calculation of the output torque or the output power of electric motor 620 may be performed by using generally known techniques, and therefore the descriptions thereof will not be repeated.

Figure 4:
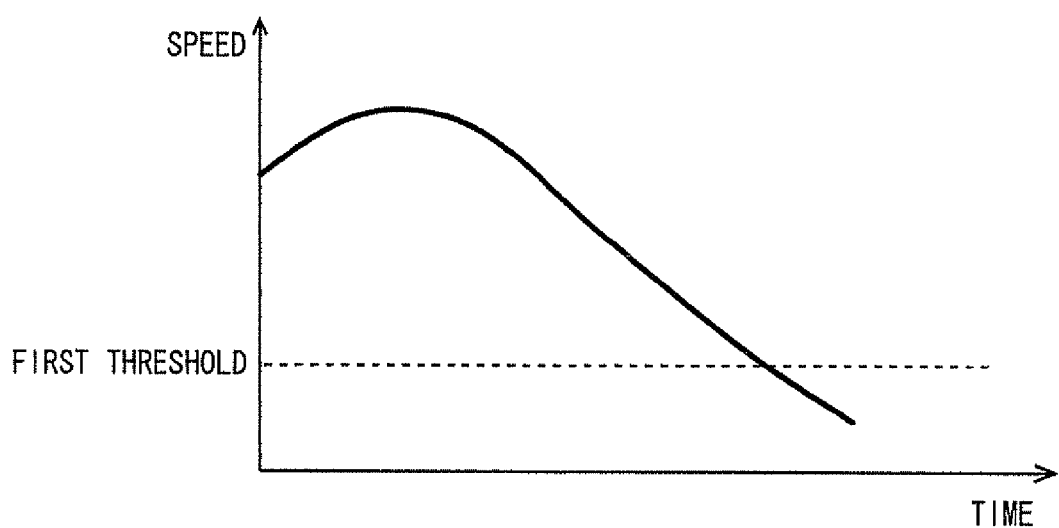
FIG. 4 is a diagram illustrating a revolution speed of a cord reel.

With reference to FIG. 4, a procedure performed by control unit 650 will be explained. In place of control unit 650, it is acceptable that the procedure to be described hereinafter is performed by a computer different from control unit 650, such as vehicular ECU 300 or the like.

At step (hereinafter, the word "step" will be abbreviated as "S") 100, whether or not a condition for starting charging power storage device 110 is satisfied is determined. The condition for starting charging power storage device 110 includes, for example, such a condition that a user has connected plug 260 of power reception cord 250 to external power supply 500B. The condition for starting charging power storage device 110 may be defined appropriately by engineers. As an example, when a voltage matching the voltage of external power supply 500B is detected by a voltage sensor disposed at a position between cord storage apparatus 600 and relay RY3, it is determined that plug 260 of power reception cord 250 is connected to external power supply 500B.

Figure 7:
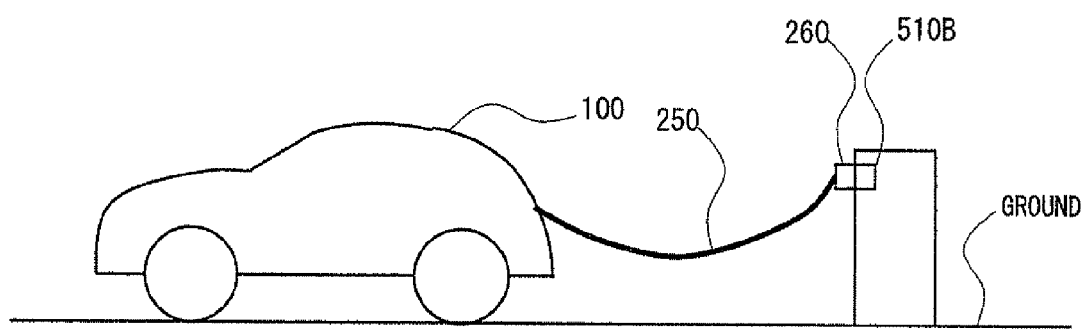
FIG. 7 is a diagram illustrating a state of the power reception cord being retracted away from the ground.

If the condition for starting charging power storage device 110 is determined to be satisfied (YES at S100), electric motor 620 is controlled to retract power reception cord 250 at a constant torque at S102. Thereafter, if the rotation speed of cord reel 610 becomes smaller than the predetermined first threshold (YES at S104), it is determined that power reception cord 250 is retracted away from the ground. Thereby, at S108, electric motor 620 is controlled to stop retracting power reception cord 250. Accordingly, power reception cord 250 can be retracted away from the ground, as illustrated in FIG. 7.

Figure 6:
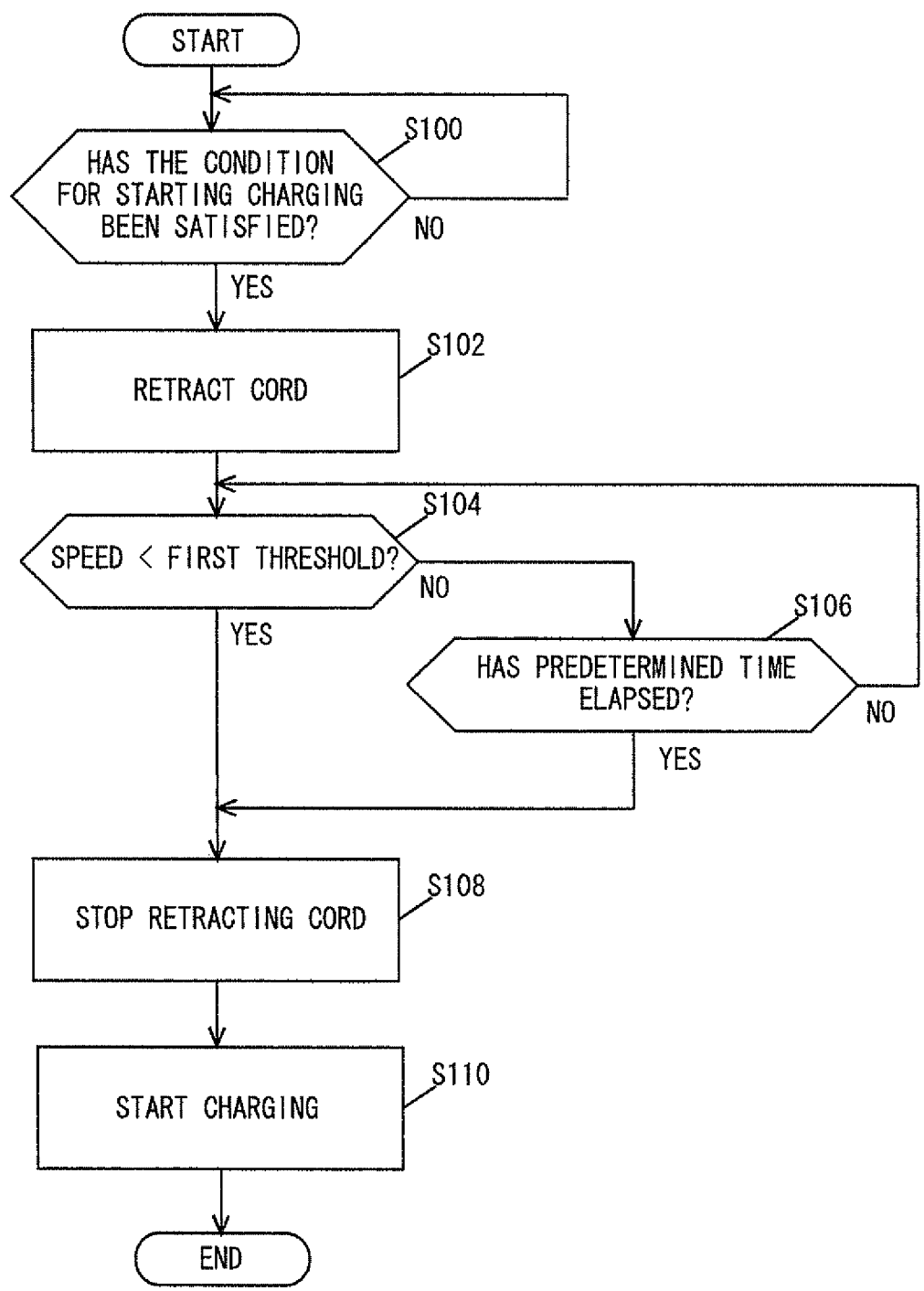
FIG. 6 is a flow chart illustrating a control process performed by a control unit.

Referring back to FIG. 6, even though the rotation speed of cord reel 610 is not smaller than the first threshold (NO at S104), if a predetermined time has elapsed after the start of retracting power reception cord 250 (YES at S106), electric motor 620 is controlled to stop retracting power reception cord 250 (S108).

After the retracting of power reception cord 250 is stopped, the charging on power storage device 110 is started at S110.

As mentioned above in the present embodiment, power reception cord 250 is retracted away from the ground. Thereby, it is possible to reduce the amount of mud or the like adhered to power reception cord 250.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

The invention claimed is:

1. A vehicle comprising:
    a retracting device configured to retract a cord to be connected to a power supply;
    a power storage device to be charged by electric power from said power supply; and
    a control unit configured to determine whether or not said cord is retracted away from the ground when said cord is connected to said power supply, control said retracting device to stop retracting said cord when said cord is retracted away from the ground, and start charging said power storage device after the retracting of said cord is stopped,
    wherein said control unit determines that said cord is retracted away from the ground when a retracting speed of said cord is lower than a predetermined threshold.

2. The vehicle according to claim 1, wherein said retracting device retracts said cord at a constant force.

3. The vehicle according to claim 1, wherein said retracting device retracts said cord at a constant power.

4. The vehicle according to claim 1, further comprising a reel configured to wind said cord, wherein
    said retracting device is an electric motor configured to rotate said reel.

5. A vehicle comprising:
    an electric motor configured to retract a cord to be connected to a power supply;
    a power storage device to be charged by electric power from said power supply; and
    a control unit configured to determine whether or not said cord is retracted away from the ground when said cord is connected to said power supply, control said electric motor to stop retracting said cord when said cord is retracted away from the ground, and start charging said power storage device after the retracting of said cord is stopped, wherein said control unit determines that said cord is retracted away from the ground when a retracting speed of said cord is lower than a predetermined threshold.

6. The vehicle according to claim 5, wherein said electric motor retracts said cord at a constant force.

7. The vehicle according to claim 5, wherein said electric motor retracts said cord at a constant power.

8. The vehicle according to claim 5, further comprising a reel configured to wind said cord, wherein said electric motor is configured to rotate said reel.

* * * * *